(12) United States Patent
Capps

(10) Patent No.: US 8,031,265 B2
(45) Date of Patent: Oct. 4, 2011

(54) SYSTEM AND METHOD FOR COMBINING INTERLACED VIDEO FRAMES

(75) Inventor: Marshall Charles Capps, Farmers Branch, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1043 days.

(21) Appl. No.: 11/841,543

(22) Filed: Aug. 20, 2007

(65) Prior Publication Data

US 2009/0051809 A1 Feb. 26, 2009

(51) Int. Cl.
*H04N 11/20* (2006.01)
(52) U.S. Cl. .................................... 348/448; 348/441
(58) Field of Classification Search .................. 348/452, 348/448, 441, 701, 180, 97, 744, 771; 386/278, 386/284; 353/31
See application file for complete search history.

(56) References Cited

U.S. PATENT DOCUMENTS

| | | | |
|---|---|---|---|
| 4,698,675 A | 10/1987 | Casey | |
| 4,733,299 A | 3/1988 | Glenn | |
| 4,876,596 A | 10/1989 | Faroudja | |
| 4,881,125 A | 11/1989 | Krause | |
| 5,177,615 A | 1/1993 | Ozaki et al. | |
| 5,260,787 A | 11/1993 | Capitant et al. | |
| 5,317,398 A | 5/1994 | Cazavant et al. | |
| 5,430,478 A | 7/1995 | Kaye et al. | |
| 5,438,358 A | 8/1995 | Kosuge | |
| 5,508,750 A | 4/1996 | Hewlett et al. | |
| 5,563,651 A | 10/1996 | Christopher et al. | |
| 6,014,182 A | 1/2000 | Swartz | |
| 6,040,869 A | 3/2000 | Dischert | |
| 6,058,140 A | 5/2000 | Smolenski | |
| 6,108,041 A * | 8/2000 | Faroudja et al. | 348/446 |
| 7,027,099 B2 | 4/2006 | Thompson et al. | |
| 7,075,581 B1 | 7/2006 | Ozgen et al. | |
| 7,095,445 B2 | 8/2006 | Kim et al. | |
| 7,129,953 B2 | 10/2006 | Champion | |
| 2007/0052846 A1 * | 3/2007 | Adams | 348/452 |
| 2007/0296858 A1 * | 12/2007 | Eymard et al. | 348/456 |

* cited by examiner

*Primary Examiner* — Victor Kostak
(74) *Attorney, Agent, or Firm* — Charles A. Brill; Wade James Brady, III; Frederick J. Telecky, Jr.

(57) ABSTRACT

System and method for combining interlaced video frames. A method embodiment for displaying a de-interlaced video sequence includes receiving a video stream, decoding the video stream to produce a sequence of interlaced video fields, creating a first de-interlaced video frame by combining at least two interlaced video fields, determining a cadence of the first de-interlaced video frame, and outputting the first de-interlaced video frame in a next de-interlaced video frame display time slot if the first de-interlaced video frame has proper cadence, while if the de-interlaced video frame has a broken cadence, re-outputting a previously outputted de-interlaced video frame in the next de-interlaced video frame display time slot. A feed-forward control signal may be used to determine which de-interlaced video frame to output and helps to minimize latency as well as storage requirements.

20 Claims, 5 Drawing Sheets

SYSTEM AND METHOD FOR COMBINING INTERLACED VIDEO FRAMES

TECHNICAL FIELD

The present invention relates generally to a system and method for image display, and more particularly to a system and method for combining interlaced video frames.

BACKGROUND

Moving pictures captured on film may typically have a frame rate of 24 Hz, while NTSC (National Television System Committee) interlaced video may have a frame rate of 30 Hz and a corresponding interlaced field rate of 60 Hz, and PAL (Phase Alternating Lines) interlaced video may have a frame rate of 25 Hz and a corresponding interlaced field rate of 50 Hz. Interlaced video is video wherein a single image may be decomposed into two fields, a first field containing even numbered scan lines of the image and a second field containing odd numbered scan lines of the image. Therefore, to convert a sequence of moving pictures from film to NTSC interlaced video or PAL interlaced video, each frame of film may need to be converted into several interlaced fields. With NTSC interlaced video, frames of film may alternately be converted into three interlaced fields and two interlaced fields, while each frame of film may need to be converted into two interlaced fields for use with PAL interlaced video. This frame to frame conversion ratio may be referred to as film cadence. For NTSC, the film cadence is 3:2, while the film cadence is 2:2 for PAL. Other commonly encountered film cadences may include 5:5 or 4:4 for 12 Hz animation and 3:2:2 for sped up film.

Modern standard definition, extended definition, and high definition display systems may be progressive in nature, wherein an entire frame may be displayed in its entirety, rather than sequentially displaying a first interlaced field of a frame followed by a second interlaced field of a frame. Therefore, displaying interlaced video, such as NTSC interlaced video or PAL interlaced video, on a progressive display may require that the interlaced video be de-interlaced. De-interlacing doubles the number of scan lines present in an interlaced field. Modern de-interlacers may use techniques such as field jam, line interpolation, or combinations thereof to create a de-interlaced frame. Field jam combines two consecutive interlaced fields, such as an even interlaced field and an odd interlaced field, into a single de-interlaced field. Line interpolation creates new lines from existing lines in an interlaced field. Furthermore, if a film cadence is detected, the de-interlacer may be able to infer which adjacent interlaced fields were mastered from the same film frame and selectively combine the interlaced fields to recreate the original progressive frames.

However, due to editing of an interlaced video stream, such as during post production, it may be possible that the film cadence is broken. For example, commercials, music videos, and other media often contain breaks in the film cadence due to post production editing that occurs after moving pictures captured on film are converted to interlaced video. When the film cadence is broken, one or more interlaced fields may be missing from the film cadence. Therefore, if the de-interlacer continues to combine adjacent interlaced fields according to the expected film cadence, fields from different film frames may be combined and this may result in combing artifacts, which may be objectionable to the viewer.

SUMMARY OF THE INVENTION

These and other problems are generally solved or circumvented, and technical advantages are generally achieved, by embodiments of a system and a method for suppressing de-interlacer combing artifacts caused by broken film cadence.

In accordance with an embodiment, a method comprises receiving a previous de-interlaced video frame, receiving a first de-interlaced video frame, outputting the previous de-interlaced video frame in a previous de-interlaced video frame display time slot, wherein the outputting occurs while the first de-interlaced video frame is being received, receiving a control input indicating whether the first de-interlaced video frame has broken cadence, receiving a second de-interlaced video frame, outputting the first de-interlaced video frame in a first de-interlaced video frame display time slot following the previous de-interlaced video frame display time slot if the control input indicates that the first de-interlaced video frame has unbroken cadence, and outputting the previous de-interlaced video frame in the first de-interlaced video frame display time slot if the control input indicates that the first de-interlaced video frame has broken cadence.

In accordance with another embodiment, a method for displaying a de-interlaced video sequence comprises decoding a received video stream to produce a sequence of interlaced video fields, generating a first de-interlaced video frame by combining at least two of the interlaced video fields, determining whether the first de-interlaced video frame contains a broken cadence, outputting a previously outputted de-interlaced video frame in a de-interlaced video frame display time slot after the generating of the first de-interlaced video frame if the first de-interlaced video frame contains a broken cadence, wherein the previously outputted de-interlaced video frame is a de-interlaced video frame outputted while generating the first de-interlaced video frame, and outputting the first de-interlaced video frame in the de-interlaced video frame display time slot after the generating of the first de-interlaced video frame if the first de-interlaced video frame does not contain a broken cadence.

In accordance with another embodiment, a display system comprises a light source, a video processor configured to provide de-interlaced video frames created from an input video sequence from a video input, the video processor to provide de-interlaced video frames one frame time after a corresponding video frame is received at the video input and to drop a de-interlaced video frame if a cadence error is detected in the de-interlaced video frame, an array of light modulators optically coupled to the light source, electrically coupled to the video processor, and positioned in a light path of the light source after the light source, the array of light modulators configured to produce images on a display plane by modulating light from the light source based on image data from the de-interlaced video frames, and a controller electronically coupled to the array of light modulators, to the video processor, and to the light source, the controller configured to load the image data received from the video processor into the array of light modulators and to provide commands to the light source.

An advantage of an embodiment is that only a very small delay is introduced into the moving picture stream. This reduces the latency caused when moving picture frames are input and when de-interlaced frames are output.

A further advantage of an embodiment is that memory usage is reduced by reducing de-interlaced frame storage. This may reduce costs and increase reliability since there are fewer components to become defective.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a digital micromirror device (DMD) based projection display system. The invention may also be applied, however, to other progressive scan (de-interlaced) display systems, both projection and direct view, such as microdisplay-based projection display systems, including those utilizing transmissive or reflective liquid crystal displays, liquid crystal on silicon, ferroelectric liquid-crystal-on-silicon, deformable micromirrors, and so forth, and cathode ray tube projection. Examples of direct view display systems may include cathode ray tube displays, liquid crystal displays, plasma displays, surface-conduction electron-emitter displays (SED), and so forth.

Figure 1A:
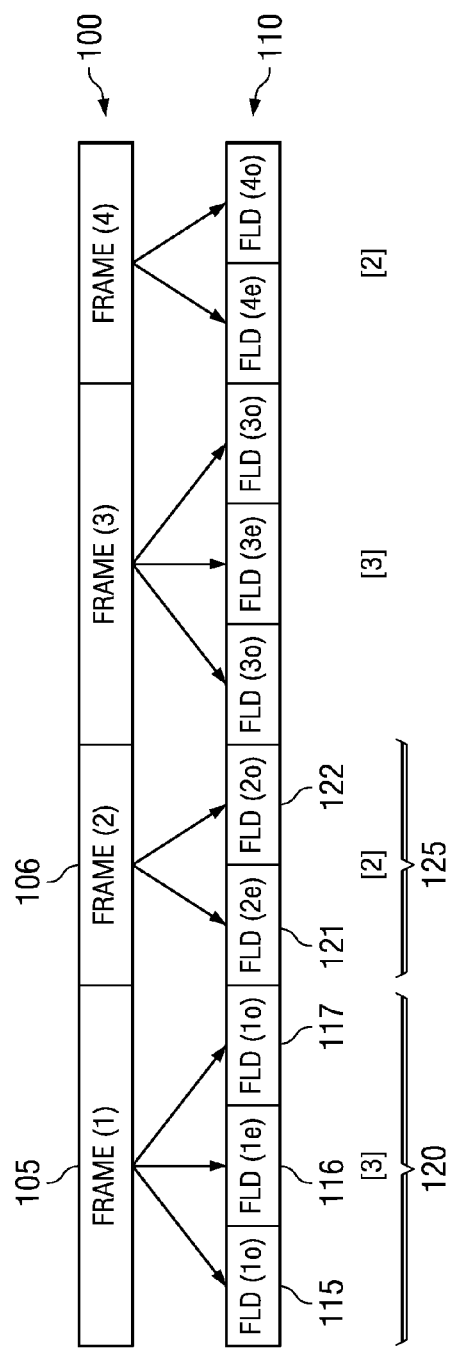
FIG. 1a is a diagram of a film based moving picture sequence converted into an NTSC interlaced video sequence.

With reference now to FIG. 1a, there is shown a film based moving picture sequence converted into an NTSC interlaced video sequence. The film based moving picture sequence comprises a sequence of film frames, shown as frame sequence 100. For example, the frame sequence includes frame (1) 105 and frame (2) 106. The conversion of a 24 Hz film based moving picture sequence to an NTSC interlaced video sequence involves alternately converting a first film frame into three interlaced fields and a second film frame into two interlaced fields. Since an interlaced field includes only half of the horizontal lines of a corresponding field, two unique interlaced fields may be created from a single film frame, an even interlaced field and an odd interlaced field. An even interlaced field includes the even numbered horizontal lines of the film frame and an odd interlaced field includes the odd numbered horizontal lines of the film frame. Although the discussion focuses on the conversion of film based moving picture sequences at 24 Hz to a 60 Hz display system, the input picture sequence and the display system may have other picture frequencies. Therefore, the discussion of 24 Hz and 60 Hz picture frequencies and associated cadences, as well as NTSC and PAL, should not be construed as being limiting to either the scope or the spirit of the present invention.

An NTSC interlaced video sequence, shown as field sequence 110, includes interlaced field (1o) 115, interlaced field (1e) 116, interlaced field (1o) 117 representing the three interlaced fields corresponding to frame (1) 105, with interlaced field (1o) 115 being the odd interlaced field and interlaced field (1e) 116 being the even interlaced field. The interlaced field (1o) 117 is the interlaced field (1o) 115 repeated. The three fields correspond to the '3' of the 3:2 film cadence, shown as group 120. The NTSC interlaced video sequence also includes interlaced field (2e) 121 and interlaced field (2o) 122 representing the two interlaced fields corresponding to frame (2) 106. The two fields correspond to the '2' of the 3:2 film cadence, shown as group 125.

Figure 1B:
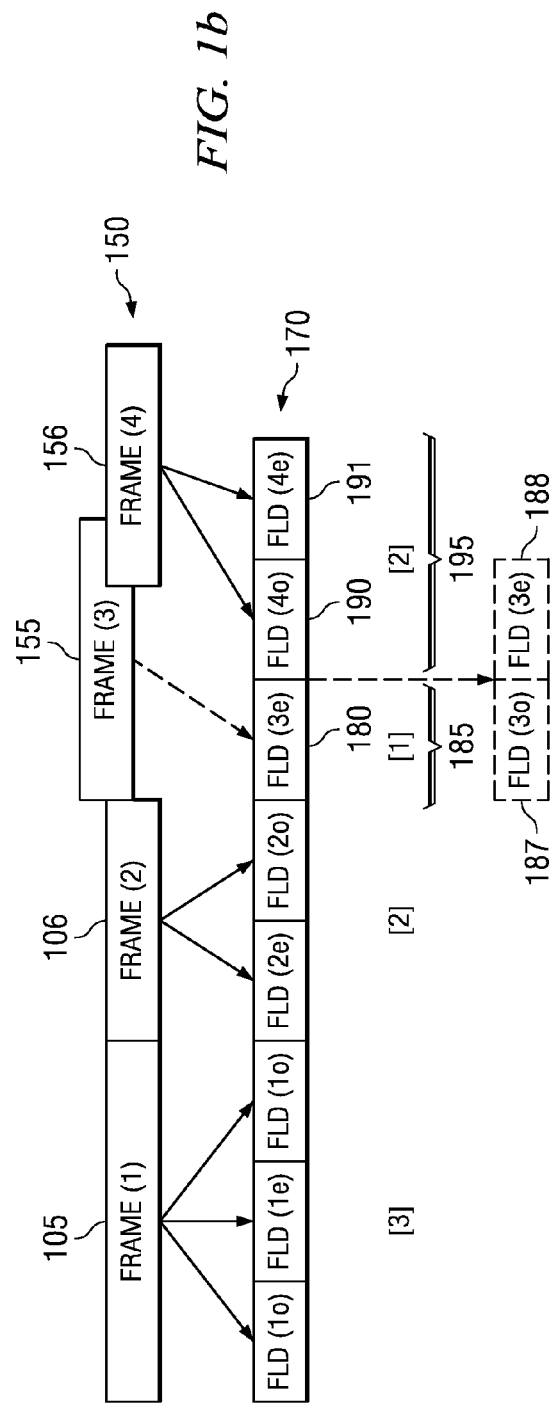
FIG. 1b is a diagram of a film based moving picture sequence converted into an NTSC interlaced video sequence, wherein the film cadence is broken.

FIG. 1b displays a film based moving picture sequence, shown as frame sequence 150 converted into an NTSC interlaced video sequence, shown as interlaced field sequence 170, wherein the film cadence is broken. The film based moving picture sequence includes a frame (3) 155 that may have had some of its interlaced fields removed, for example, during post production. With proper 3:2 film cadence, the frame (3) 155 should be converted into three interlaced fields in the interlaced field sequence 170. However, only one interlaced field, interlaced field (3e) 180, is present in the interlaced field sequence 170, making up group 185. Two other interlaced fields, interlaced field (3o) 187 and interlaced field (3e) 188, may have been deleted during editing, for example. Frame (4) 156 may be converted into two interlaced fields in the interlaced field sequence 170, interlaced field (4o) 190 and interlaced field (4e) 191), forming group 195.

If the interlaced field sequence 170 is displayed or used to create de-interlaced frames, the missing interlaced field(s) and the broken film cadence may cause visual artifacts commonly referred to as combing. Combing occurs when two visually different interlaced fields are combined into one de-interlaced field. There may be mismatched images as well as rough, jagged contours, and so forth, all of which may be objectionable.

Figure 2A:
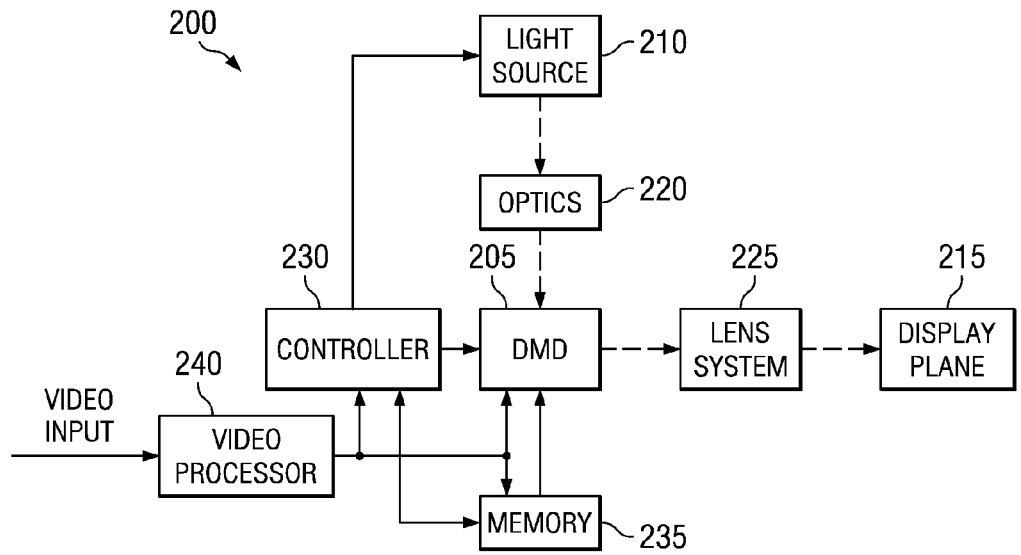
FIG. 2a is a diagram of a display system.

FIG. 2a illustrates an exemplary DMD-based projection display system 200. The DMD-based projection display system 200 includes a DMD 205 that modulates light produced by a light source 210. The DMD 205 is an example of a microdisplay and may include a plurality of light modulators arranged in an array. Other examples of microdisplays may include transmissive or reflective liquid crystal, liquid crystal on silicon, ferroelectric liquid-crystal-on-silicon, deformable micromirrors, and so forth. In a microdisplay, a number of light modulators may be arranged in a rectangular, square, diamond shaped, and so forth, array. In addition to a microdisplay-based projection display system, the embodiments may have applicability to cathode ray tube (CRT) projection display systems, and direct view display systems, such as CRT displays, liquid crystal displays, plasma displays, surface-conduction electron-emitter displays (SED), and so forth.

Each light modulator in the microdisplay may operate in conjunction with the other light modulators in the microdisplay to modulate the light produced by the light source 210.

The light modulated by the DMD 205 may be used to create images on a display plane 215. The DMD-based projection display system 200 also includes an optics system 220, which may be used to collimate the light produced by the light source 210 as well as to collect stray light, and a lens system 225, which may be used to manipulate (for example, focus) the light reflecting off the DMD 205.

The DMD 205 may be coupled to a controller 230, which may be responsible for loading image data into the DMD 205, controlling the operation of the DMD 205, providing micromirror control commands to the DMD 205, controlling the light produced by the light source 210, and so forth. A memory 235, which may be coupled to the DMD 205 and the controller 230, may be used to store the image data, as well as configuration data, color correction data, and so forth.

A video processor 240 may have an input coupled to a video input port. The video input port may provide a variety of video input signals, such as a composite video input, s-video input, component video input, digital video input, and so on, from sources such as video cassette players, DVD players, cable television, satellite, multimedia devices, a networked (wired and wireless) multimedia server, and so forth. The video processors 240 may be responsible for operations on the video input signal such as de-interlacing, buffering, filtering, color correction, up-conversion, and so forth. The video processor 240 may provide, as output, a de-interlaced (progressive scan) video frame sequence to the controller 230, the memory 235, as well as the DMD 205.

Figure 2B:
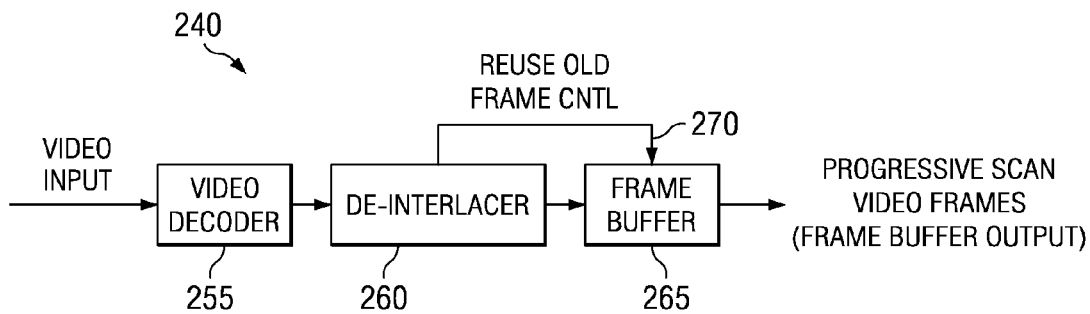
FIGS. 2b and 2c are diagrams of a video processor.

FIG. 2b illustrates a detailed view of the video processor 240. The video processor 240 includes a video decoder 255, a de-interlacer 260, and a frame buffer 265. In general, the video decoder 255 may be used to convert a video input signal in a first format into a common format that may be used by the video processor 240, such as a digitized interlaced video format. For example, the video decoder 255 may convert analog composite interlaced video into digital interlaced video. The digital interlaced video may then be de-interlaced by the de-interlacer 260. The de-interlacer 260 may utilize techniques such as frame jam or line interpolation or both to de-interlace the digital interlaced video, thereby creating digital de-interlaced video frames. The digital de-interlaced video frames from the de-interlacer 260 may then be output to the frame buffer 265, which may provide temporary storage for the digital de-interlaced video frames before they are provided to the controller 230, the memory 235, and/or the DMD 205 where the digital de-interlaced video frames may receive further processing and manipulating prior to display. The frame buffer 265 may primarily be used for frame rate conversion or other image processing functions, for example.

Figure 2C:
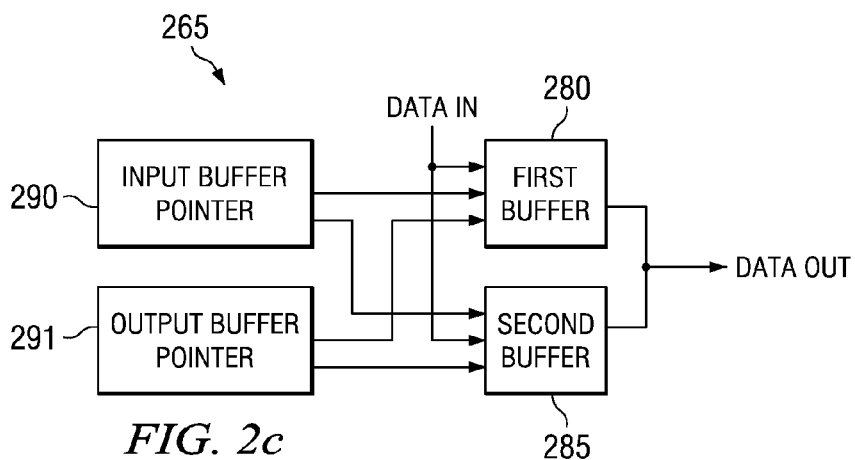

The frame buffer 265 may have sufficient storage for two digital de-interlaced video frames. The storage may be used to store a first digital de-interlaced video frame that may be a digital de-interlaced video frame that the frame buffer 265 is currently providing to the controller 240, the memory 235, and/or the DMD 205. The storage may also be used to store a second digital de-interlaced video frame that the frame buffer 265 may be receiving from the de-interlacer 260. FIG. 2c illustrates an exemplary frame buffer 265. The frame buffer 265 includes first buffer 280 and a second buffer 285. Either the first buffer 280 or the second buffer 285 may be configured to store an incoming digital de-interlaced video frame, such as the second digital de-interlaced video frame. An input buffer pointer 290 may point to either the first buffer 280 or the second buffer 285, designating it as an input buffer. An output buffer pointer 291 may point to either the first buffer 280 or the second buffer 285, designating it as an output buffer. The contents of the buffer pointed to by the output buffer pointer 291 may be provided to the controller 230, the DMD 205, or the memory 235.

The de-interlacer 260 may be configured to output portions of a digital de-interlaced video frame to the frame buffer 265 as it is creating it, rather than storing the digital de-interlaced video frame internally until the de-interlacing is complete and then sending the completed digital de-interlaced video frame to the frame buffer 265 in its entirety. An advantage of such an implementation is a decrease in storage requirements at both the de-interlacer 260 and the frame buffer 265.

As the de-interlacer 260 completes the de-interlacing, it may be able to determine (detect) broken film cadence. If the de-interlacer 260 detects broken film cadence, the de-interlacer 260 may assert a value on a reuse old frame control signal line 270 coupled to the frame buffer 265. The frame buffer 265, upon detection of the value on the reuse old frame control signal line 270, may repeat the outputting of the digital de-interlaced video frame that it has already outputted (the first digital de-interlaced video frame, for example) and discard the digital de-interlaced video frame that it has just received from the de-interlacer 260. While the frame buffer 265 is repeating the output of the digital de-interlaced video frame, the de-interlacer 260 may be creating another digital de-interlaced video frame from the digital interlaced video provided by the video decoder 255.

Although shown as a control signal line, the reuse old frame control signal line 270 may also be implemented in software. For example, when the de-interlacer 260 detects broken film cadence, it may set a control bit in a memory used to provide information to the frame buffer 265. Furthermore, a complementary function may be implemented. For example, instead of asserting the specified value on the reuse old frame control signal line 270 to signify to the frame buffer 265 that it should re-output the previously outputted digital de-interlaced video frame, a specified value may be asserted on an output new frame control signal line to signify that the newly received digital de-interlaced video frame should be outputted rather than the previously outputted digital de-interlaced video frame.

Figure 3:
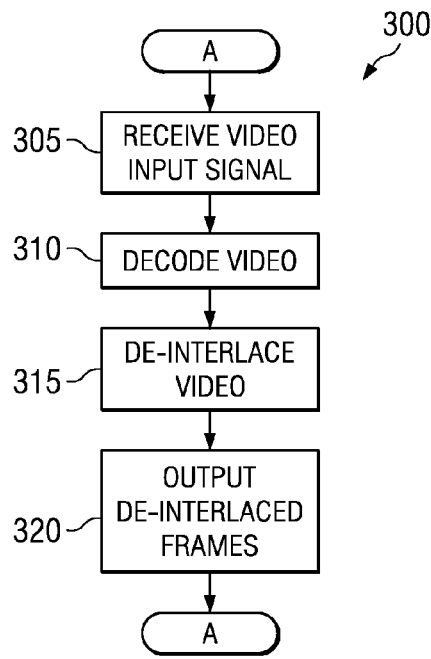
FIG. 3 is a diagram of a sequence of events in the displaying of a video input stream.

FIG. 3 illustrates a sequence of events 300 in the displaying of a video input stream on a progressive scan display system. The displaying of images from a video input stream on a progressive scan display system may begin with a receiving of a video input signal from a video input (block 305). The video input signal may contain a sequence of interlaced fields, progressive frames, and so forth, depending on the nature of the video input signal's source. As the video input signal is being received, a video decoder, such as the video decoder 255 (FIG. 2b), may be used to decode and convert the received video input signal into a common internal format, such as an interlaced field stream, for processing purposes (block 310). For example, the video decoder 255 may convert an interlaced analog composite signal into an interlaced field stream. Although the discussion herein focuses on an interlaced field stream as the common internal format, other common internal formats may be used, such as digital progressive frame stream, analog interlaced field stream, analog progressive frame stream, and so forth. Therefore, the discussion should not be construed as being limiting to either the scope or the spirit of the present invention.

After video decoding and converting by the video decoder 255, a de-interlacer, such as the de-interlacer 260, may convert the interlaced field stream into a digital de-interlaced frame stream (block 315). As each de-interlaced frame is created by the de-interlacer 260, the digital de-interlaced frame may then be provided to a frame buffer, such as the frame buffer 265, and the frame buffer 265 may output the digital de-interlaced frame to be displayed (block 320). The receiving, decoding, de-interlacing, and outputting may be in continuous operation to provide a continuous stream of digital de-interlaced frames to be displayed. The displaying of the video input stream may be a continuously operating process, therefore, the sequence of events 300 returns to block 305 to display other images from the video input stream.

Figure 4:
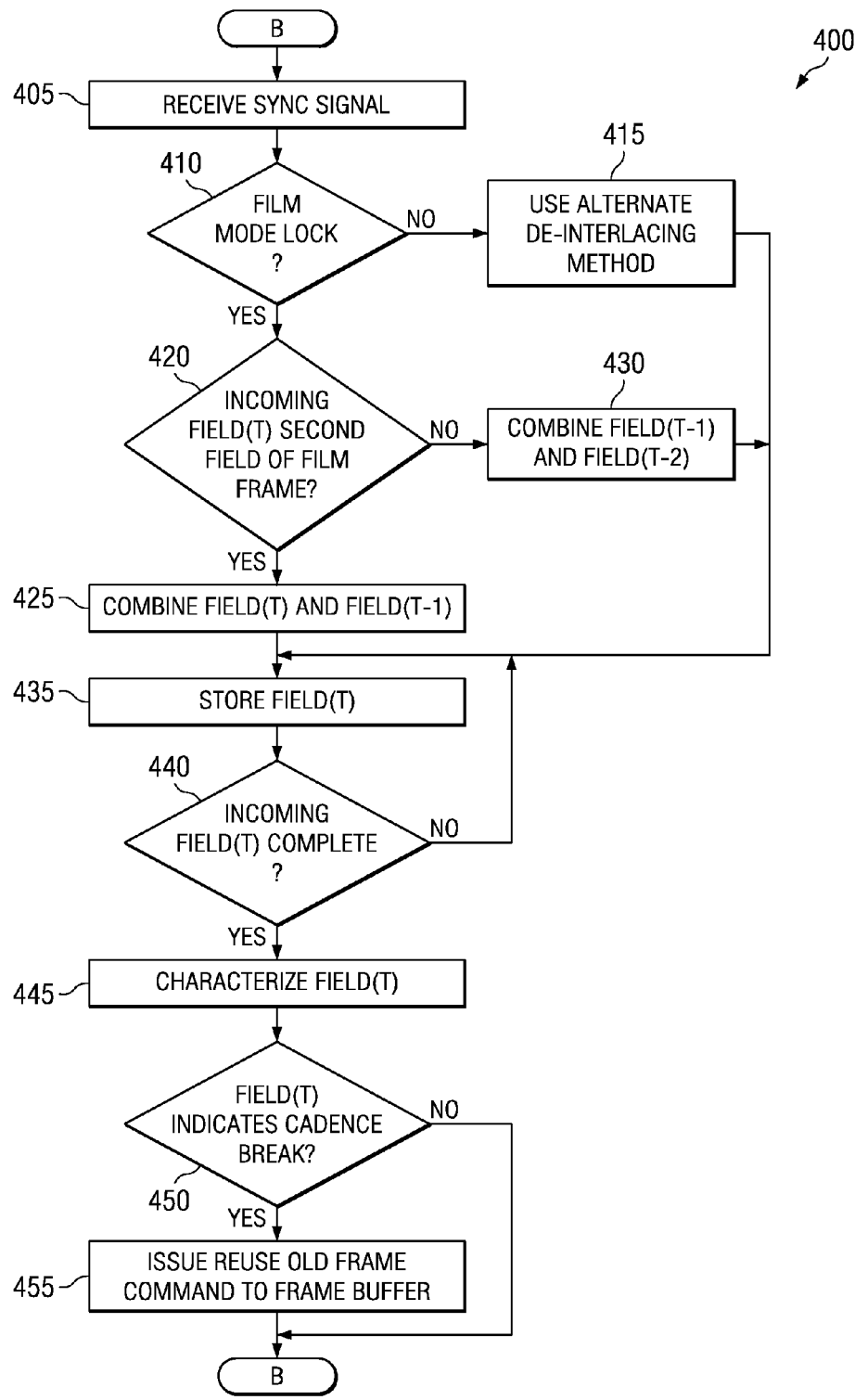
FIG. 4 is a diagram of a sequence of events in the operation of a de-interlacer.

FIG. 4 illustrates a sequence of events 400 in the operation of a de-interlacer, such as the de-interlacer 260 (FIG. 2b). The sequence of events 400 may be an implementation of the conversion of the interlaced field stream into a digital de-interlaced frame stream as discussed previously. The conversion may begin with a receiving of a synchronization (sync) signal from the video decoder 255 (block 405). The sync signal may indicate the beginning of a new interlaced video field. After the receiving of the sync signal, the de-interlacer 260 may check to determine if it is operating in film mode (block 410). This determination may be needed since the operation of the de-interlacer 260 may differ depending on its operating mode. If the de-interlacer 260 is not operating in film mode, then the de-interlacer 260 may utilize an alternate de-interlacing method, such as motion adaptive de-interlacing or line doubling to de-interlace interlaced video fields (block 415).

However, if the de-interlacer 260 is operating in film mode, then the de-interlacer 260 may check to determine if the incoming interlaced field, field(t), is a second field of a film frame (block 420). If the incoming interlaced field, field(t), is the second field of a film frame, then the de-interlacer 260 may de-interlace the interlaced field by combining the incoming interlaced field, field(t), with an interlaced field previously received, field(t−1) (block 425). If the incoming interlaced field, field(t), is not the second field of a film frame, then the de-interlacer 260 may de-interlace the interlaced field by combining two previously received interlaced fields, field(t−1) and field(t−2) (block 430). The combination of specific interlaced fields to create de-interlaced frames may be dependent on the cadence of the incoming interlaced field stream, with this discussion focusing on an incoming interlaced field stream with a cadence of 3:2. That is, if the cadence of the incoming interlaced field stream is different from 3:2, then a combination of specific interlaced field streams may be different. Therefore, the discussion of the embodiment shown in FIG. 4 should not be construed as being limiting to either the spirit or the scope of the embodiments.

Since the de-interlacing occurs as the interlaced field, field (t), is being received, the de-interlacing may not complete until all of the interlaced field, field(t), has been received. Therefore, the de-interlacer 260 may store the interlaced field, field(t), as it arrives (block 435) and check to determine if it has received the interlaced field, field(t), in its entirety (block 440). Once the de-interlacer 260 has received the entire interlaced field, field(t), the de-interlacer 260 may check to determine if the interlaced field, field(t), has a broken film cadence (block 450), based on a characterization of the interlaced field, field(t), by the de-interlacer 260 (block 445). If the interlaced field, field(t), has a broken film cadence, then the de-interlacer 260 may issue a reuse old frame command to the frame buffer 265 (block 455). If the interlaced field, field (t), does not have a broken film cadence, then the de-interlacer 260 may wait for the arrival of another sync signal, indicating arrival of a new interlaced field.

Figure 5:
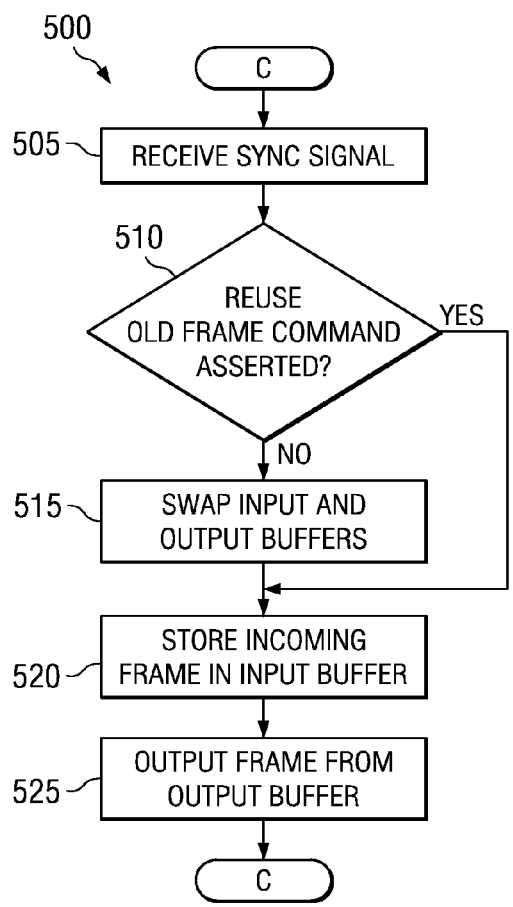
FIG. 5 is a diagram of a sequence of events in the operation of a frame buffer.

FIG. 5 illustrates a sequence of events 500 in the operation of a frame buffer, such as the frame buffer 265 (FIG. 2b), which outputs the digital de-interlaced frames as discussed previously. The outputting of the digital de-interlaced frames may begin with a receiving of a sync signal from the video decoder 255 (block 505). After receiving the sync signal, the frame buffer 265 may check to determine if it has received a reuse old frame command from the de-interlacer 260 (block 510). If it has received the reuse old frame command from the de-interlacer 260, then a digital de-interlaced frame stored in the input buffer may not have proper film cadence and the frame buffer 265 may discard the digital de-interlaced frame that it has stored in its input buffer memory. The frame buffer 265 may do this by not switching its internal frame buffers after receiving the next sync signal. This may be accomplished by simply not changing pointer values, for example.

If the frame buffer 265 has not received the reuse old frame command from the de-interlacer 260 (block 510), then the digital de-interlaced frame stored in the input buffer may have proper film cadence and the frame buffer 265 may output the digital de-interlaced frame that it has stored in its input buffer memory. The frame buffer 265 may also need to provide storage space for an incoming digital de-interlaced frame. The frame buffer 265 may accomplish this by swapping its internal pointer values (block 515). Its input buffer pointer, for example, the input buffer pointer 290, may be changed to point to a frame buffer pointed to by its output buffer pointer, for example, the output buffer pointer 291, and the output buffer pointer 291 may be changed to point to the frame buffer pointed to by the input buffer pointer 290.

After swapping pointer values (if the previous digital de-interlaced frame had proper film cadence) or not swapping pointer values (if the previous digital de-interlaced frame did not have proper film cadence), the frame buffer 265 may store a next incoming digital de-interlaced frame in its input buffer (block 520), overwriting the previous contents of that buffer. The frame buffer 265 may simultaneously output the previous digital de-interlaced frame now stored in its output buffer (block 525) if the previous frame had proper film cadence, or the frame buffer 265 may output the previously outputted digital de-interlaced frame (a frame previous to the previous frame now stored in its output buffer) if the previous frame did not have proper film cadence.

Figure 6:
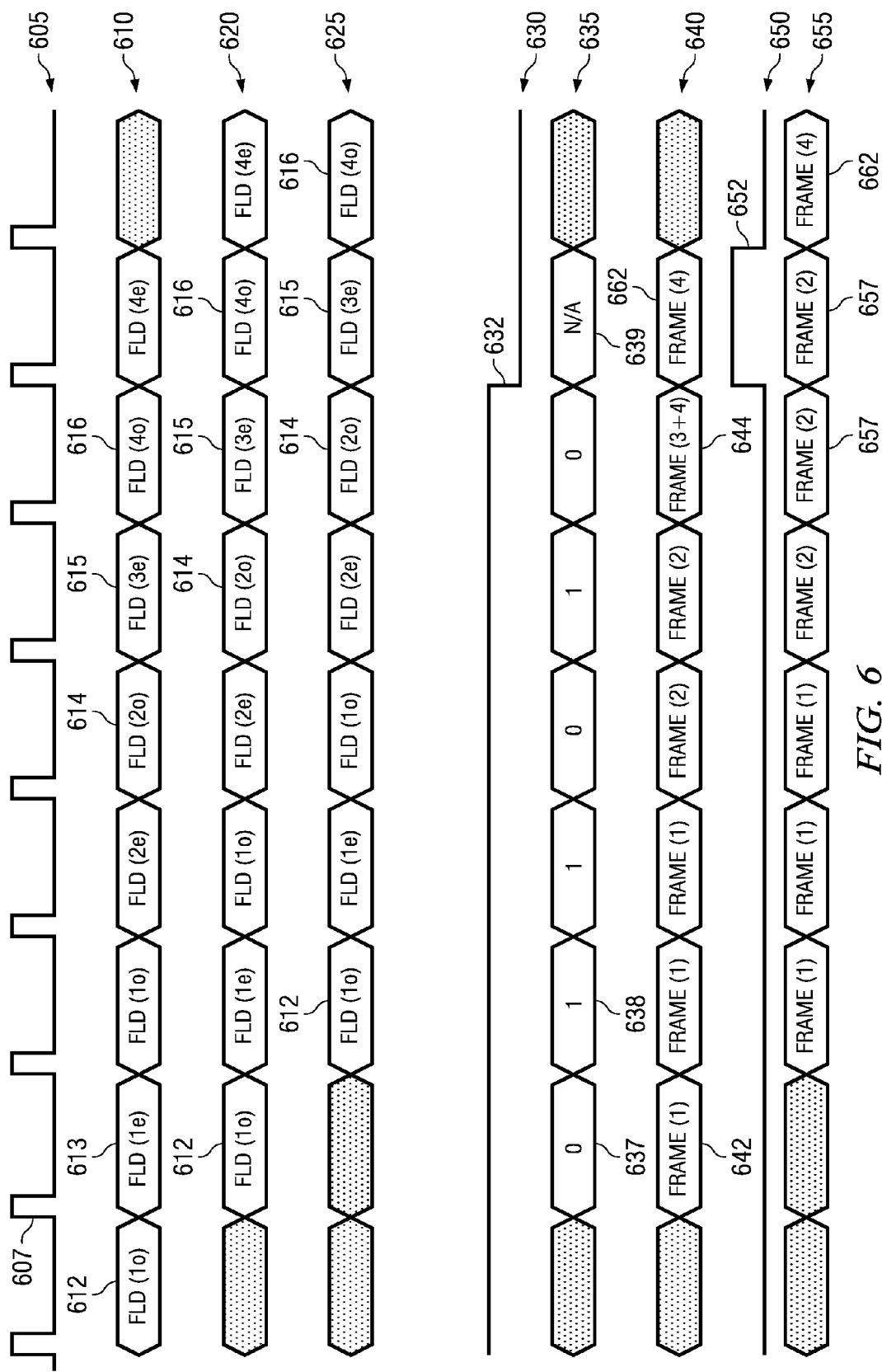
FIG. 6 is a diagram illustrating the progression of interlaced video fields and digital de-interlaced frames through a variety of stages of a de-interlacer and a frame buffer.

FIG. 6 illustrates a progression of interlaced video fields and digital de-interlaced frames through various stages of a de-interlacer, such as the de-interlacer 260, and a frame buffer, such as the frame buffer 265. A first trace 605 displays a sequence of sync signals from a video decoder, such as the video decoder 255. A pulse, such as pulse 607, may indicate the beginning of an interlaced video field and/or a digital de-interlaced frame. A second trace 610 displays a sequence of interlaced video fields. Shown are interlaced video fields, such as interlaced video fields FLD (1o) 612 and FLD (1e) 613, which may be odd and even interlaced fields corresponding to film frame one (1). Also shown is interlaced video field FLD (2o) 614, an odd interlaced field corresponding to film frame two (2), FLD (3e) 615, an even interlaced field corresponding to film frame three (3), and FLD (4o) 616, an odd interlaced field corresponding to film frame four (4). There is no interlaced video field FLD (3o) since the interlaced video field may have been lost during post production editing, for example.

A third trace 620 displays contents of interlaced video field store (t−1), which may be a one video field delayed version of the sequence of interlaced video fields shown in the second trace 610. A fourth trace 625 displays contents of interlaced video field store (t−2), which may be a two video field delayed version of the sequence of interlaced video fields shown in the second trace 610. A fifth trace 630 displays the state of a film mode lock signal line. The film mode lock signal line may be in a logic true state until a break in film cadence has been detected. As shown in FIG. 6, the fifth trace 630 drops from the logic true value (high) to a logic false value (low), shown as falling edge 632, after a determination that after interlaced video frame FLD (3e) 615, the next field is FLD (4o) 616, rather than FLD (3o).

A sixth trace 635 displays a state of a jam direction value line. The jam direction corresponds to which interlaced video fields may be combined to create a digital de-interlaced frame. For example, if the jam direction value line has a value of zero (0), such as value 637, then the digital de-interlaced frame may be a combination of interlaced video field(t) and interlaced video field(t−1). If the jam value line has a value of one (1), such as value 638, then the digital de-interlaced frame may be a combination of interlaced video field(t−1) and interlaced video field(t−2). If the film cadence has been broken, the jam direction value line may have a don't care or a not applicable value, shown as element 639.

A seventh trace 640 displays a sequence of digital de-interlaced frames created from the sequence of interlaced video fields in trace 610. For example, digital de-interlaced frame FRAME (1) 642 may be created from a combination of interlaced video fields FLD (1o) 612 and FLD (1e) 613. However, a simple combination of interlaced video fields may result in a digital de-interlaced frame FRAME (3+4) 644 from a combination of interlaced video fields FLD (3e) 615 and FLD (4o) 616 since the film cadence was broken at that point.

An eighth trace 650 displays a state of a reuse old frame command. The eighth trace 650 may remain logic false (e.g., low) until the reuse old frame command has been asserted, as indicated by logic true (e.g., high) pulse 652. The de-interlacer 260, after creating the digital de-interlaced frame FRAME (3+4) 644, may detect that the film cadence has been broken. Therefore, the de-interlacer 260 asserts the reuse old frame command.

A ninth trace 655 displays an output of the frame buffer 265. The frame buffer 265 outputs a digital de-interlaced frame one frame time after receiving the digital de-interlaced frame. However, if the frame buffer 265 detects that the reuse old frame command has been asserted, the frame buffer 265 may output a previously outputted digital de-interlaced frame rather than a newly received digital de-interlaced frame. For example, the frame buffer 265 may repeat the outputting of digital de-interlaced frame FRAME (2) 657 instead of outputting the digital de-interlaced frame FRAME (3+4) 644 because of that frame's broken film cadence.

The de-interlacer 260, after creating a digital de-interlaced frame FRAME (4) 662, may determine that the frame has proper film cadence. Therefore, the de-interlacer 260 does not assert the reuse old frame command. This may be seen in the eighth trace 650 returning to logic false (e.g., low) after the pulse 652. Without the reuse old frame command asserted, the frame buffer 265 outputs the digital de-interlaced frame FRAME (4) 662 received in a previous frame time. In this manner, the output of frames that have been improperly de-interlaced because of broken film cadence generally may be avoided.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   receiving a previous de-interlaced video frame;
   receiving a first de-interlaced video frame;
   outputting the previous de-interlaced video frame in a previous de-interlaced video frame display time slot, wherein the outputting occurs while the first de-interlaced video frame is being received;
   receiving a control input indicating whether the first de-interlaced video frame has broken cadence;
   receiving a second de-interlaced video frame;
   outputting the first de-interlaced video frame in a first de-interlaced video frame display time slot following the previous de-interlaced video frame display time slot if the control input indicates that the first de-interlaced video frame has unbroken cadence; and
   outputting the previous de-interlaced video frame in the first de-interlaced video frame display time slot if the control input indicates that the first de-interlaced video frame has broken cadence.

2. The method of claim 1, wherein the outputting the first de-interlaced video frame in the first de-interlaced video frame display time slot or the outputting the previous de-interlaced video frame in the first de-interlaced video frame display time slot occurs while the second de-interlaced video frame is being received.

3. The method of claim 1, further comprising, prior to the outputting of the previous de-interlaced video frame in the previous de-interlaced video frame display time slot, receiving a first synchronization signal.

4. The method of claim 3, wherein the outputting of the first de-interlaced video frame or the outputting of the previous de-interlaced video frame in the first de-interlaced video frame display time slot occurs after receiving a second synchronization signal after the receiving of the first synchronization signal.

5. The method of claim 1, wherein a de-interlaced video frame being received is buffered in an input buffer, wherein a de-interlaced video frame being outputted is buffered in an output buffer, and wherein the outputting of the first de-interlaced video frame in the first de-interlaced video frame display time slot after receiving the first de-interlaced video frame comprises swapping the output buffer and the input buffer prior to the second de-interlaced video frame being received.

6. The method of claim 5, wherein the swapping comprises:
   setting an output buffer pointer to point to the input buffer; and
   setting an input buffer pointer to point to the output buffer.

7. The method of claim 1, wherein a de-interlaced video frame being received is buffered in an input buffer, wherein a de-interlaced video frame being outputted is buffered in an output buffer, and wherein the outputting of the previous de-interlaced video frame in the first de-interlaced video frame display time slot while receiving the first de-interlaced video frame comprises retaining a current value of an input buffer pointer.

8. The method of claim 1, wherein the control input indication is detected before any portion of the second de-interlaced video frame has been received.

9. A method for displaying a de-interlaced video sequence, the method comprising:
- decoding a received video stream to produce a sequence of interlaced video fields;
- generating a first de-interlaced video frame by combining at least two of the interlaced video fields;
- determining whether the first de-interlaced video frame contains a broken cadence;
- outputting a previously outputted de-interlaced video frame in a de-interlaced video frame display time slot after the generating of the first de-interlaced video frame if the first de-interlaced video frame contains a broken cadence, wherein the previously outputted de-interlaced video frame is a de-interlaced video frame outputted while generating the first de-interlaced video frame; and
- outputting the first de-interlaced video frame in the de-interlaced video frame display time slot after the generating of the first de-interlaced video frame if the first de-interlaced video frame does not contain a broken cadence.

10. The method of claim 9, wherein the decoding further comprises digitizing the interlaced video fields.

11. The method of claim 9, wherein the generating comprises:
- combining an odd interlaced video field and an even interlaced video field to create a second de-interlaced video frame; and
- providing the second de-interlaced video frame to an input buffer.

12. The method of claim 11, wherein the two interlaced video fields comprise consecutive interlaced video fields.

13. The method of claim 9, wherein the determining comprises:
- detecting the cadence of the first de-interlaced video frame; and
- asserting a control indication in response to a determining that the de-interlaced video frame has a broken cadence.

14. The method of claim 13, wherein the detecting comprises determining source video frames of the interlaced video fields used to create the first de-interlaced video frame.

15. The method of claim 14, wherein the first de-interlaced video frame has unbroken cadence if the interlaced video fields used to create the first de-interlaced video frame are from a single frame.

16. The method of claim 9, wherein the outputting of the first de-interlaced video frame comprises:
- storing the first de-interlaced video frame in an input buffer;
- receiving a synchronization signal;
- swapping the input buffer and an output buffer; and
- outputting the output buffer.

17. The method of claim 9, wherein the outputting of the previously outputted de-interlaced video frame comprises:
- storing the first de-interlaced video frame in the input buffer;
- receiving a synchronization signal; and
- outputting the output buffer.

18. A display system comprising:
- a light source;
- a video processor configured to provide de-interlaced video frames created from an input video sequence from a video input, the video processor to provide de-interlaced video frames one frame time after a corresponding video frame is received at the video input and to drop a de-interlaced video frame if a cadence error is detected in the de-interlaced video frame;
- an array of light modulators optically coupled to the light source, electrically coupled to the video processor, and positioned in a light path of the light source after the light source, the array of light modulators configured to produce images on a display plane by modulating light from the light source based on image data from the de-interlaced video frames; and
- a controller electronically coupled to the array of light modulators, to the video processor, and to the light source, the controller configured to load the image data received from the video processor into the array of light modulators and to provide commands to the light source.

19. The display system of claim 18, wherein the video processor comprises:
- a video decoder configured to convert the video input sequence with a first video format into a video stream with a second video format;
- a de-interlacer coupled to the video decoder, the de-interlacer configured to combine interlaced video fields from the video stream into a video stream of de-interlaced video frames;
- a frame buffer coupled to the de-interlacer, the frame buffer configured to store de-interlaced video frames from the de-interlacer and to output de-interlaced video frames; and
- a control signal line having a first end coupled to the de-interlacer and a second end coupled to the frame buffer, the control signal line to convey a drop frame control signal from the de-interlacer when the de-interlacer detects a de-interlaced video frame with broken cadence.

20. The display system of claim 19, wherein the frame buffer comprises:
- a first buffer coupled to the de-interlacer, the first buffer to selectively store incoming de-interlaced video frames or output previously received de-interlaced video frames;
- a second buffer coupled to the de-interlacer, the second buffer to selectively output previously received de-interlaced video frames or store incoming de-interlaced video frames;
- an input buffer pointer coupled to the first buffer and the second buffer, the input buffer pointer to select either the first buffer or the second buffer to store incoming de-interlaced video frames; and
- an output buffer pointer coupled to the first buffer and the second buffer, the output buffer pointer to select either the first buffer or the second buffer to output previously received de-interlaced video frames.

* * * * *